(12) United States Patent  
Takamiya et al.

(10) Patent No.: US 7,806,595 B2
(45) Date of Patent: Oct. 5, 2010

(54) MINIATURE LINEAR MOTION GUIDE UNIT

(75) Inventors: Kenji Takamiya, Tokyo (JP); Yasuhiro Otsuji, Gifu (JP)

(73) Assignee: Nippon Thompson Co., Ltd., Tokyo (JP)

( * ) Notice: Subject to any disclaimer, the term of this patent is extended or adjusted under 35 U.S.C. 154(b) by 485 days.

(21) Appl. No.: 11/773,502

(22) Filed: Jul. 5, 2007

(65) Prior Publication Data

US 2008/0008407 A1    Jan. 10, 2008

(30) Foreign Application Priority Data

Jul. 7, 2006    (JP)    ............... 2006-187804

(51) Int. Cl.
    *F16C 29/06*    (2006.01)
(52) U.S. Cl. .............. 384/45; 384/21; 384/43
(58) Field of Classification Search ........... 384/15, 384/43–45, 49, 21
    See application file for complete search history.

(56) References Cited

U.S. PATENT DOCUMENTS

| 4,701,058 A | * | 10/1987 | Mottate ...................... 384/45 |
| 4,828,402 A | * | 5/1989 | Osawa ........................ 384/15 |
| 4,986,508 A | * | 1/1991 | Osawa et al. ................ 248/300 |
| 5,088,839 A | * | 2/1992 | Tsukada ..................... 384/45 |
| 5,131,780 A | * | 7/1992 | Love ......................... 403/290 |
| 5,297,873 A | * | 3/1994 | Komiya ....................... 384/45 |
| 6,296,413 B1 | * | 10/2001 | McCann et al. ............. 403/51 |
| 6,513,976 B2 | * | 2/2003 | Maiss et al. ................ 384/15 |
| 7,153,027 B2 | * | 12/2006 | Yamaguchi et al. ......... 384/15 |
| 7,344,310 B2 | * | 3/2008 | Mine .......................... 384/49 |

FOREIGN PATENT DOCUMENTS

| JP | 03157514 A | * | 7/1991 |
| JP | 7190054 |   | 7/1995 |
| JP | 11344032 A | * | 12/1999 |
| JP | 2000027860 A | * | 1/2000 |
| JP | 2005249113 |   | 9/2005 |

* cited by examiner

*Primary Examiner*—Marcus Charles
(74) *Attorney, Agent, or Firm*—Cozen O'Connor

(57) ABSTRACT

A miniature linear motion guide unit can eliminate the need for additional machining on a track rail, and thus improve the accuracy of the track rail and reduce the manufacturing costs. A track rail (R) having raceway grooves (4, 5) is fixed to a mounting surface by a fixing member (A). A slider (S) straddles and moves on the track rail. The fixing member has a recessed groove (7) formed in an opposing mounting face (6) facing the mounting surface and straddling the track rail. Part of the recessed groove is in contact with the track rail when the recessed groove straddles the track rail. A mounting hole (11) is drilled in a portion of the recessed groove of the fixing member away from the track rail. A stopper member (10) such as a bolt is inserted in the mounting hole and fixed to the mounting surface.

9 Claims, 6 Drawing Sheets

MINIATURE LINEAR MOTION GUIDE UNIT

FIELD OF THE INVENTION

This invention relates to a technique for fabricating a downsized linear motion guide unit having a slider sliding along a track rail.

DESCRIPTION OF THE RELATED ART

For use of a linear motion guide unit having a slider sliding along a track rail, the track rail is fixed to a surface on which the linear motion guide unit is mounted (hereinafter referred to as "the mounting surface"). For fixing the track rail, typically, screw holes are drilled through the track rail at either end thereof and bolts are screwed in the screw holes for fixing the track rail.

Various types of such linear motion guide units have been developed, from one used in a large-sized machine tool to one used in a miniature industrial product. Recently, an ultra-miniature linear motion guide unit having a track rail of 5 mm or less has been developed.

Such a reduction in size of the linear motion guide unit makes it difficult to drill holes for fixing the track rail to the mounting surface. In particular, it is close to impossible to drill holes in an ultra-miniature linear motion guide unit having a track rail of 5 mm or less.

To overcome this, the track rail of the miniature linear motion guide unit may be fixed to the mounting surface in such a manner as disclosed in, for example Japanese Patent 3281157 and Japanese Unexamined Patent Publication 2005-249113. Thereby, the track rail can be fixed to the mounting surface without drilling holes in the track rail.

Specifically, as described in Japanese Patent 3281157, fitting grooves are formed in the two ends of the track rail. Fixing members are fitted into the fitting grooves, and fixed to the mounting surface. Alternatively, as described in Japanese Unexamined Patent Publication 2005-249113, external threads project from the two ends of the track rail and are screwed through a base material, and then the base material is fixed to the mounting surface. These devices eliminate the need to drill screw holes in the track rail, and make it possible to fix the track rail to the mounting surface even if it is an ultra-miniature linear motion guide unit.

However, for fixing the track rail to the mounting surface in the manner as described above, external screws or fitting grooves must be provided at the two ends of the track rail. As a result, the need for performing additional machining on the two ends of the track rail arises.

If the additional machining for forming the external screws or the fitting grooves is performed on the two ends of the ultra-miniature track rail, the additional machining affects the track rail to cause distortion or backlash, which reduces the straightness, leading to a reduction in accuracy of the track rail.

In addition, the additional machining on the track rail entails machining costs, resulting in heightened manufacturing costs.

SUMMARY OF THE INVENTION

It is an object of the present invention to provide a technique for fastening a track rail of a miniature linear motion guide unit, which can eliminate the need for additional machining on the track rail, and thus improve the accuracy of the track rail and reduce the manufacturing costs.

A first aspect of the present invention provides a miniature linear motion guide unit which comprises a track rail having raceway grooves and fixed to a mounting surface, on which the miniature linear motion guide unit is mounted, by a fixing member, and a slider straddling the track rail and sliding thereon. The miniature linear motion guide unit is characterized in that the fixing member has a recessed groove formed in an opposing mounting face facing the mounting surface and straddling the track rail, in which part of the recessed groove is in contact with the track rail when the recessed groove straddles the track rail, and a mounting hole drilled in a portion of the recessed groove of the fixing member away from the track rail, and a stopper member such as a bolt is inserted in the mounting hole and fixed to the mounting surface.

A second aspect of the present invention is characterized in that the recessed groove is maintained out of contact with raceway grooves formed in the track rail in a dimensional relationship with the track rail when the recessed groove straddles the track rail.

A third aspect of the present invention is characterized in that the fixing member has a raised portion protruding from the opposing mounting face, and an under face of the raised portion is in contact with the mounting surface when the track rail is in contact with the recessed groove, and the mounting hole is provided between the raised portion and the recessed groove.

A fourth aspect of the present invention is characterized in that the recessed grooved has a bottom face and side walls formed on opposite sides of the bottom face, and the side walls form tapered faces to gradually decrease the space between the side walls toward the bottom face, and the tapered faces are in contact with the track rail.

A fifth aspect of the present invention is characterized in that the fixing member lies along the axis of the track rail when the recessed groove straddles the track rail.

A sixth aspect of the present invention is characterized in that the fixing member lies at right angles to the axis of the track rail when the recessed groove straddles the track rail.

According to the first aspect, because the recessed groove provided in the fixing member straddles the track rail and is in contact with the track rail, the need for performing additional machining on the track rail to fix it to the mounting surface is eliminated.

In consequence, there is no possibility that the additional machining causes a reduction in the accuracy of the track rail, so that the accuracy of the track rail is maintained high.

According to the second aspect, because when the recessed groove straddles the track rail, the recessed groove is out of contact with the raceway grooves of the track rail, even when the fixing member is used to fix the track rail to the mounting surface, the raceway grooves are not distorted and deformed. In this manner, because the raceway groove is not distorted and deformed, it is possible to smoothly attach and detach the slider to and from the track rail.

According to the third aspect, after the contact between the track rail and the recessed groove has been made, the under face of the raised portion comes into contact with the mounting surface. Because of this, when the fixing member is tightened by the stopper member, the track rail is pressed into the recessed groove. This makes it possible to more strongly fix the track rail to the mounting surface.

According to the fourth aspect, the opposing side walls of the recessed groove is designed to form tapered faces such that the space between the side walls is decreased toward the bottom face, and the tapered faces are in contact with the track rail. Thus, the track rail is reliably prevented from deviating in the width direction.

Also, because the tapered faces are designed to decrease the space between the side walls toward the bottom face of the recessed groove, it is possible to facilitate the dimensional control of the recessed groove.

According to the fifth aspect, because the fixing member extends parallel to the axis of the track rail when the recessed groove straddles the track rail, the fixing member will not form an obstruction when a plurality of the track rails are arranged in parallel.

According to the sixth aspect, because the fixing member is placed at right angles to the axis of the track rail R when the recessed groove straddles the track rail, it is possible to reliably fix the fixing member to the mounting surface even when there is no extra space behind the track rail in the axis direction.

In addition, when a plurality of the recessed grooves are formed in the fixing member, it is possible to use the single fixing member to fix a plurality of track rails arranged parallel to each other.

DETAILED DESCRIPTION OF THE PREFERRED EMBODIMENT

Figure 1:
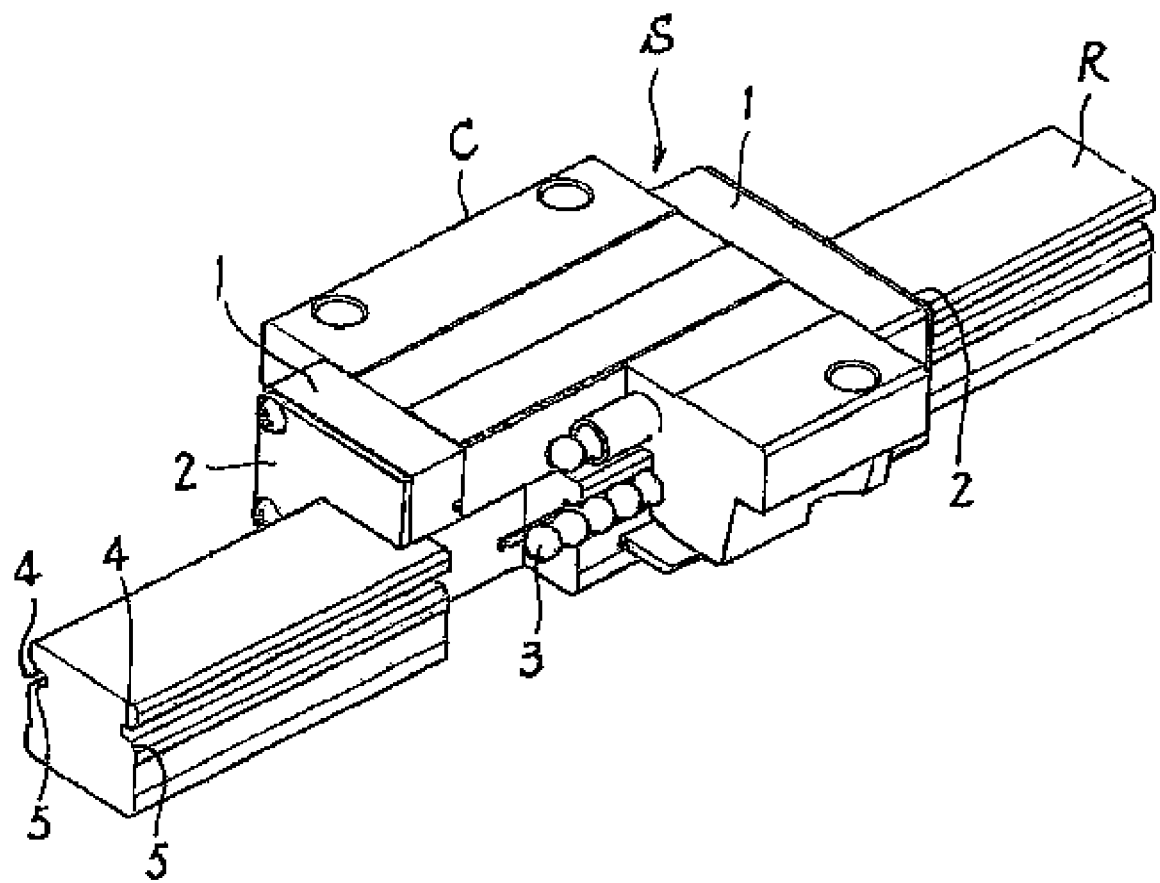
FIG. 1 is a perspective view illustrating a linear motion guide unit of a first embodiment according to the present invention.

A first embodiment according to the present invention will be described now with reference to FIG. 1 to FIG. 4. The precondition of the linear motion guide unit according to the present invention is that it is of a miniature size, and all the structural elements themselves are of a miniature size.

A slider S running on a track rail R is composed of a casing C, a pair of end caps 1 provided at the two ends of the casing C, and a pair of end seals 2 provided on the external sides of the end caps 1.

A guide groove extending through the end caps 1 is formed endlessly in the slider S. Rolling elements 3 such as balls or cylindrical rollers are inserted in the endless guide groove.

Raceway grooves each made up of an upper raceway face 4 and a lower raceway face 5 are respectively formed in the width-direction side faces of the track rail R. The slider S smoothly runs on the track rail R while the rolling elements 3 roll in the raceway groove.

For using the linear motion guide unit, the track rail R must be fixed to a mounting surface. At this point, a fixing member A is used to fix the track rail R to the mounting surface.

Figure 2:
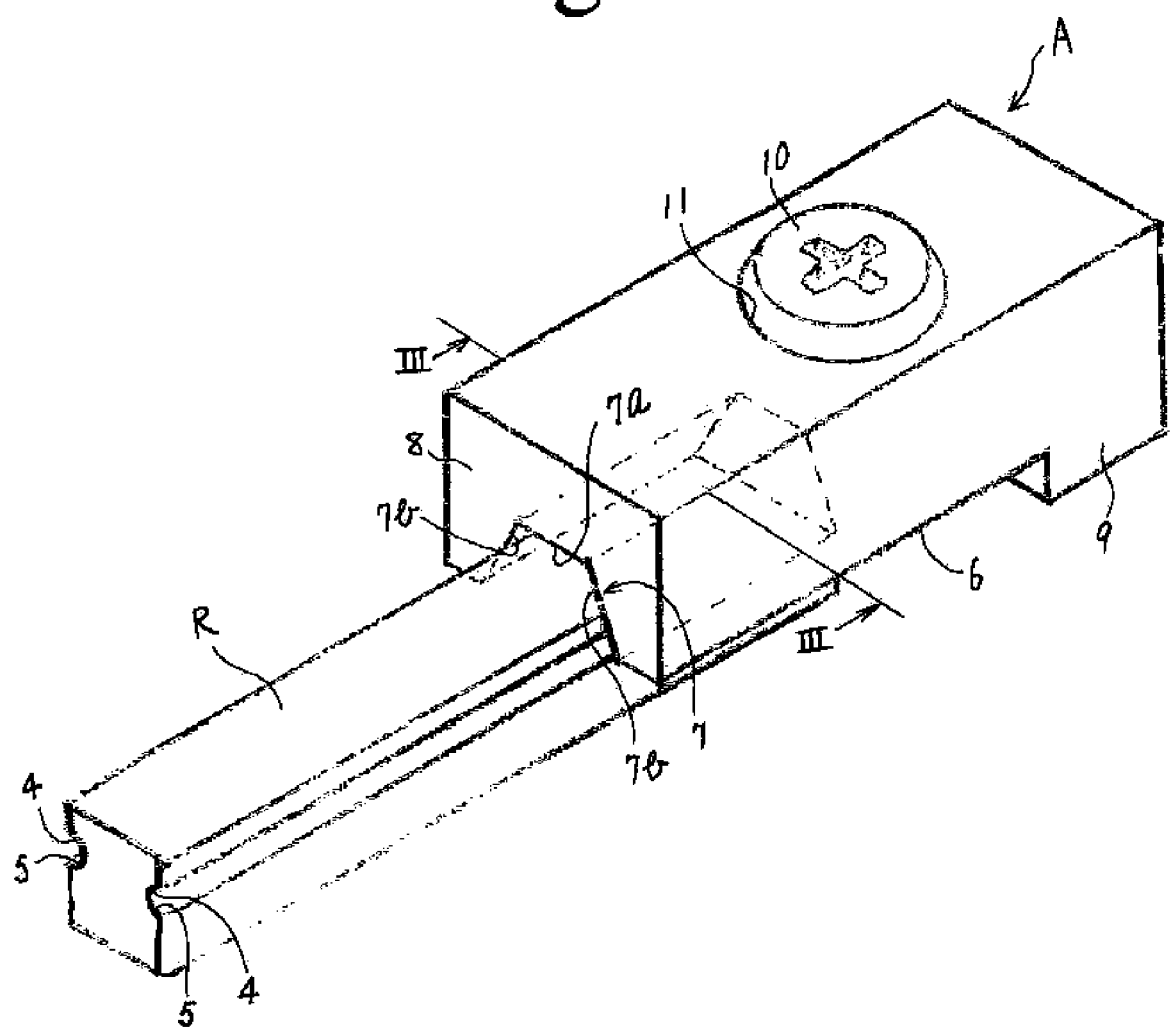
FIG. 2 is a partially enlarged view illustrating a track rail fixed by a fixing member.
Figure 3:
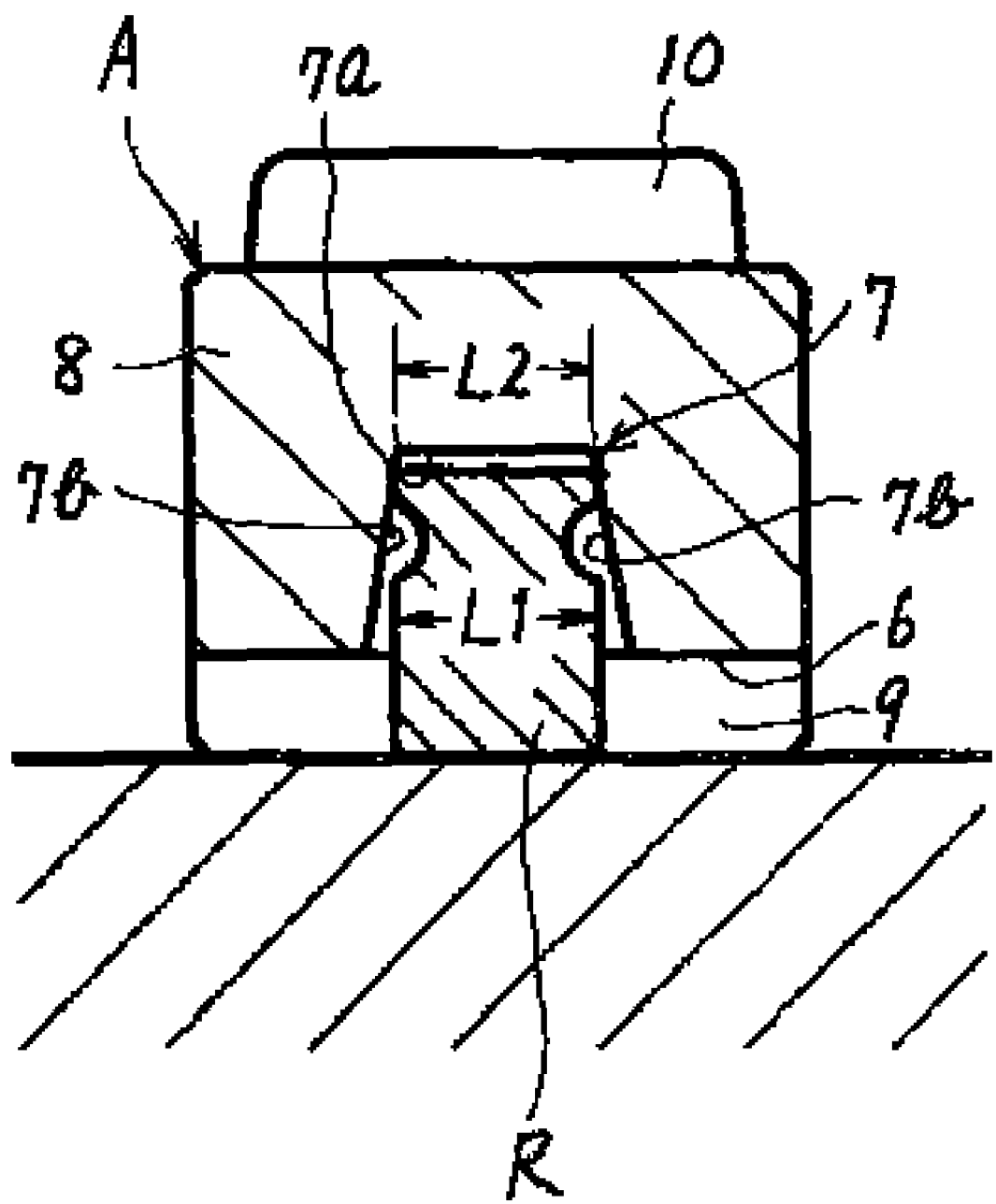
FIG. 3 is a sectional view taken along the III-III line in FIG. 2.

As illustrated in FIGS. 2 and 3, the fixing member A has a recess groove 7 formed in an opposing mounting face 6 facing the mounting surface to which the track rail R is fixed. One end of the recessed groove 7 is open on the rail-side open face 8 so as to allow the recessed groove 7 to straddle the track rail R.

The recessed groove 7 has side walls 7b formed on opposite sides of the bottom face 7a. The two side walls 7b are designed to form tapered faces in such a manner that the width between the opposing side walls 7b tapers down from the opposing mounting face 6 toward the bottom face 7a.

The width of the bottom face 7a is designed to be slightly smaller than the width L1 of the track rail R. Accordingly, when the recessed groove 7 straddles the track rail R, the upper edges of the two side faces of the track rail R come into contact with the respective side walls 7b (tapered faces) in the recessed groove 7 so as to be prevented from coming closer in.

At this point, the dimensional relationship is maintained such that the side walls 7b of the recessed groove 7 are out of contact with the raceway groove formed in the track rail R.

When the recessed groove 7 straddles the track rail R, the fixing member A is designed to extend parallel to the axis of the track rail R. At this point, the recessed groove 7 is formed to a length from the rail-side open face 8 to approximately one third the length of the fixing member A in the axis direction of the track rail R.

The fixing member A has a raised portion 9 protruding from the opposing mounting face 6 at the opposite end to the rail-side open face 8. The dimensional relationship is maintained such that the under face of the raised portion 9 is in full contact with the mounting surface when the track rail R is installed in contact with the recessed groove 7.

Figure 4:
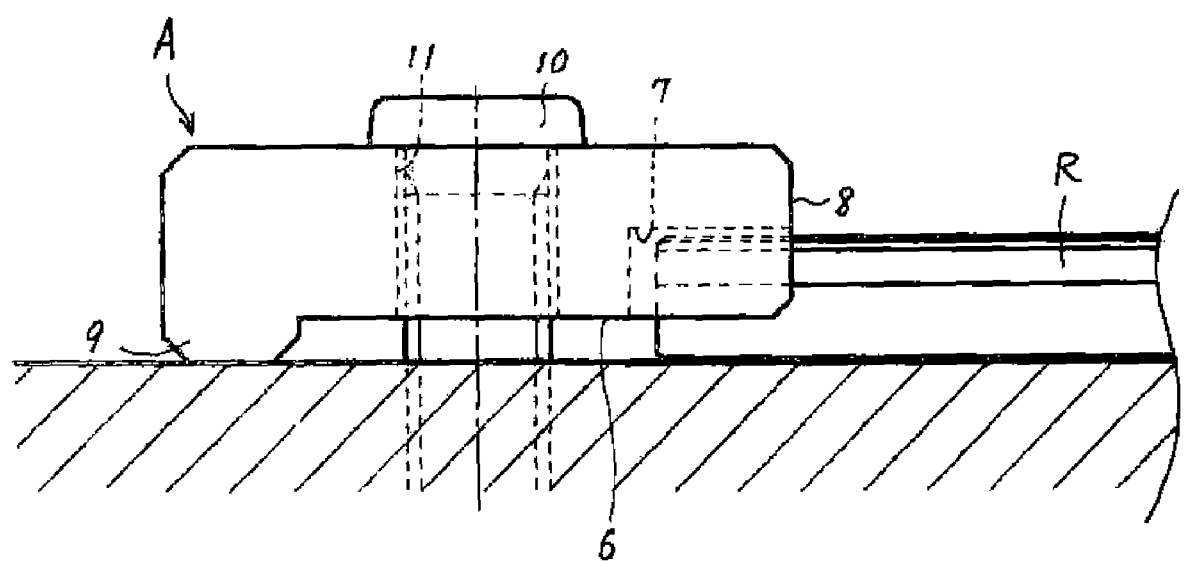
FIG. 4 is a sectional side view illustrating a track rail fixed by the fixing member.

As illustrated in FIG. 4, the fixing member A further has a mounting hole 11 drilled approximately at the mid point between the recessed groove 7 and the raised portion 9, and a stopper member 10 such as a bolt is inserted through the mounting hole 11. Accordingly, when the recessed grooved 7 straddles the track rail R, the mounting hole 11 is situated away from the track rail R in the recessed groove 7.

When the recessed grooved 7 straddles the track rail R as described above, the upper edges of the two side faces of the track rail R are in contact with the respective side walls 7b (tapered faces) in the recessed groove 7 and the bottom face of the raised portion 9 is in contact with the mounting surface. In this state, the stopper 10 such as a bolt is inserted through the mounting hole 11 and tightened therein. Thereupon, the fastening force of the stopper member 10 presses the fixing member A against the mounting surface and the side walls 7b (tapered faces) of the recessed groove 7 against the track rail R to make contact between them. In other words, the operation of the fastening force of the stopper member 10 is divided into two, a pressing force pressing the recessed groove 7 against the track rail R and a pressing force pressing the raised portion 9 against the mounting surface.

In this manner, according to the first embodiment, the track rail R is fixed to the mounting surface by making the contact between the recessed groove 7 and the track rail R. For this reason, the track rail R can be reliably fixed without additional machining on the track rail R for fixing it to the mounting surface.

Also, the two side walls 7b of the recessed groove 7 form tapered faces and the tapered faces are designed to be in contact with the track rail R. This makes it possible to reliably prevent the track rail R from deviating in the width direction, and also to facilitate the dimensional control of the recessed groove 7.

Because the mounting hole 11 is provided between the raised portion 9 and the recessed groove 7, it is possible to divide the operation of the fastening force caused by the stopper member 10 into two, a pressing force pressing the recessed groove 7 against the track rail 7 and a pressing force pressing the raised portion 9 against the mounting surface.

Accordingly, it is possible to reliably press the recessed groove 7 against the track rail R and the raised portion against the mounting surface so as to make reliable connection therebetween.

When the recessed groove 7 straddles the track rail R, the recessed groove 7 is out of contact with the raceway groove of the track rail R. Hence, even when the fixing member A is used to fix the track rail R to the mounting surface, this does not give rise to distortion and deformation the raceway groove. In this manner, because the raceway groove is not distorted and deformed, it is possible to smoothly attach and detach the slider S to and from the track rail R.

In addition, because the fixing member A is designed to extend parallel to the axis of the track rail R when the recessed groove 7 straddles the track rail R, the fixing member A will not form an obstruction when a plurality of the track rails R are arranged in parallel.

A second embodiment according to the present invention will be described below with reference to FIG. 5. The second embodiment differs in the orientation of the recessed groove formed in the fixing member from the first embodiment, and the structure and operation of the other components are the same as those in the first embodiment.

Therefore, the same structural elements in the second embodiment as those in the first embodiment are designated with the same reference numerals and the difference from the first embodiment is described in the second embodiment.

Figure 5:
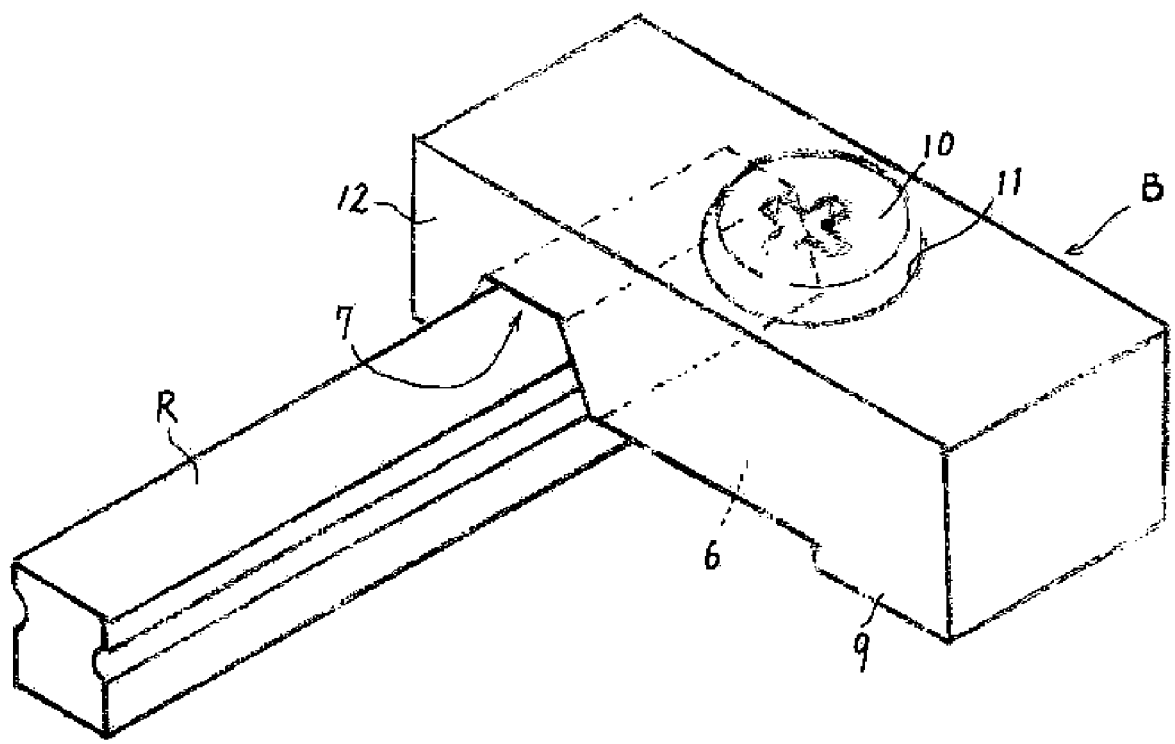
FIG. 5 is a perspective view illustrating a linear motion guide unit of a embodiment according to the present invention.

In a fixing member B illustrated in FIG. 5, the recessed groove 7 with side walls forming the tapered faces is formed in the opposing mounting face 6 so as to straddle the track rail R. One end of the recessed groove 7 is open on the rail-side open face 12, and the other end thereof is open on the opposite face to the rail-side open face 12.

When the recessed groove 7 straddles the track rail R, the raised portion 9 protrudes from the opposing mounting face 6 in such a manner as to extend parallel to the track rail R. Accordingly, after the recessed groove 7 straddles the track rail R, the fixing member B form an angle of 90 degrees with the axis of the track rail R.

In the second embodiment, the mounting hole 11 is provided between the recessed groove 7 and the raised portion 9.

Thus, as in the case of the first embodiment, by inserting and tightening the stopper member 10 in the mounting hole 11, the track rail R can also be fixed in the recessed groove 7 with the raised portion 9 pressed against the mounting surface.

Because the fixing member B is designed to form an angle of 90 degrees with the axis of the track rail R when the recessed groove 7 straddles the track rail R, the fixing member B can be reliably fixed to the mounting surface even when there is no extra space behind the track rail R in the axis direction.

In addition, because the recessed groove 7 has two open ends in the second embodiment the fixing member B is not necessarily fixed to the end of the track rail R. As a result, the fixing member B can be provided in an optimum position in accordance with the structure of the mounting surface, the track rail R or the like.

Further, when a plurality of the recessed grooves 7 are formed in the fixing member B, it is possible to use the single fixing member B to fix a plurality of track rails R arranged parallel to each other. Note that when a plurality of the track rails R are fixed by the single fixing member B, the mounting hole 11 is desirably provided in each position between the parallel recessed grooves 11, that is, between the adjacent recessed grooves 7. This is because, if the stopper member 10 is screwed in each position between the adjacent track rails R, all the track rails R can be reliably pressed against the mounting surface to come into close contact therewith.

Figure 6:
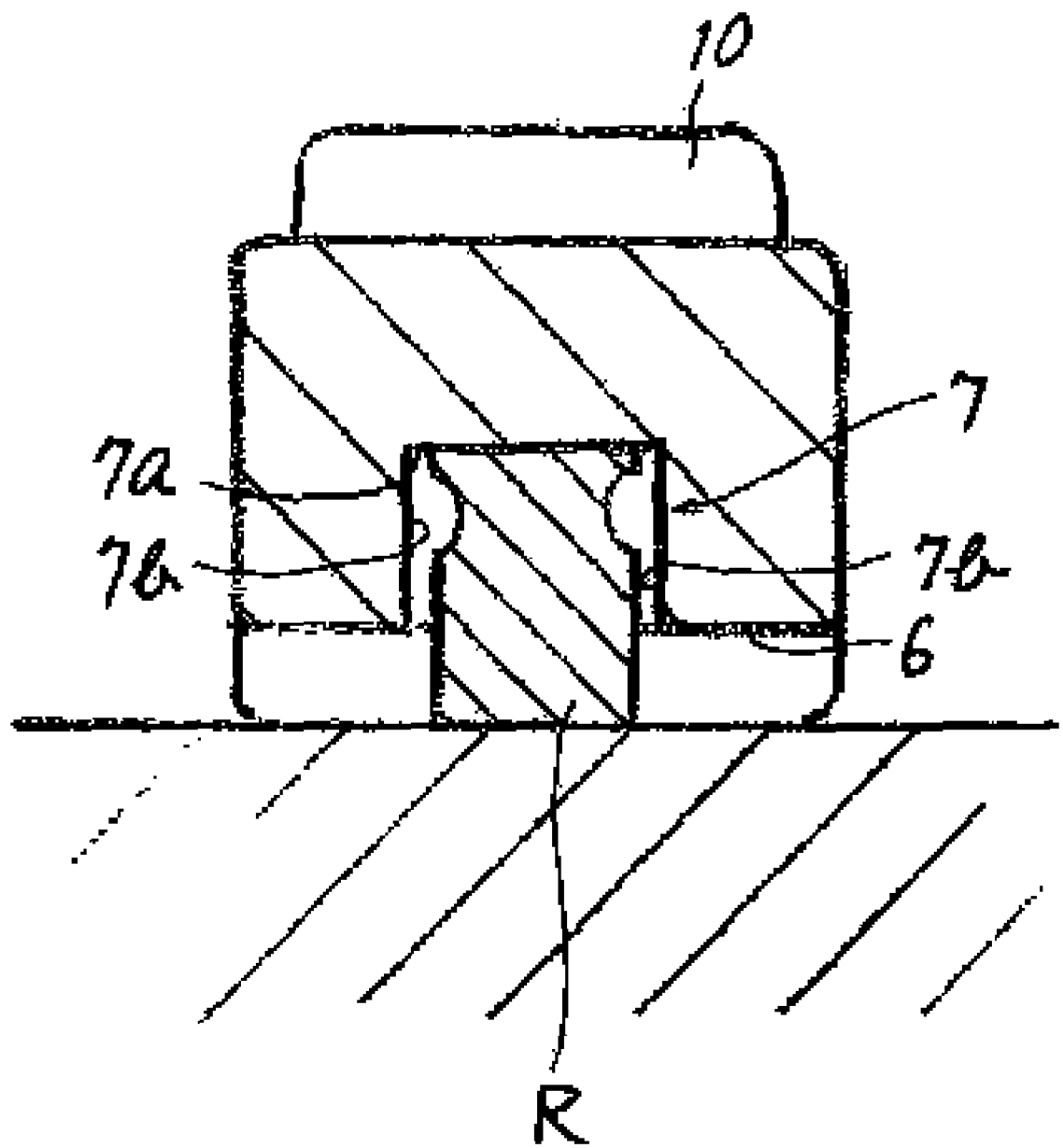
FIG. 6 is a sectional view illustrating a recessed groove in another embodiment.

In the first and second embodiment, the side walls of the recessed groove 7 are designed to form the tapered faces. However, the side walls of the recessed groove 7 do not necessarily form the tapered faces. For example, in another embodiment as illustrated in FIG. 6, the side walls 7b of the recessed groove 7 may equally be designed to form an angle of 90 degrees with the opposing mounting face 6 and the top face of the track rail R may be in contact with the bottom face 7a of the recessed groove 7.

In this case, by tightening the stopper member 10, the track rail R can be fixed by being pressed against the mounting surface. However, when the side walls 7b are designed to form the tapered faces and the upper edges of the side faces of the track rail R are contact with the tapered faces, it is possible to reliably prevent the track rail R from deviating in the width direction.

What is claimed is:

1. A miniature linear motion guide unit, comprising a track rail having raceway grooves and fixed to a mounting surface, on which the miniature linear motion guide unit is mounted by a fixing member, and a slider straddling the track rail and sliding thereon, wherein the fixing member having:
    an opposing mounting face facing the mounting surface;
    a recessed groove formed in the opposing mounting face and straddling the track rail wherein the recessed groove straddles a face flush to a face straddled by the slider, part of the recessed groove being in contact with the track rail when the recessed groove straddles the track rail;
    a mounting hole drilled in a position away from the track rail; and
    a stopper member inserted in the mounting hole and fixed to the mounting surface.

2. A miniature linear motion guide unit according to claim 1, wherein the recessed groove is maintained out of contact with raceway grooves fanned in the track rail in a dimensional relationship with the track rail when the recessed groove straddles the track rail.

3. A miniature linear motion guide unit according to claim 2, wherein the fixing member further has a raised portion protruding from the opposing mounting face,
    wherein an under face of the raised portion is in contact with the mounting surface when the track rail is in contact with the recessed groove, and the mounting hole is provided between the raised portion and the recessed groove.

4. A miniature linear motion guide unit according to claim 2, wherein the recessed grooved has a bottom face and side walls formed on opposite sides of the bottom face, wherein the side walls form tapered faces to gradually decrease the space between the side walls toward the bottom face, and the tapered faces are in contact with the track rail.

5. A miniature linear motion guide unit according to claim 1,
    wherein the fixing member further has a raised portion protruding from the opposing mounting face, wherein an under face of the raised portion is in contact with the mounting surface when the track rail is in contact with the recessed groove, and the mounting hole is provided between the raised portion and the recessed groove.

6. A miniature linear motion guide unit according to claim 5, wherein the recessed grooved has a bottom face and side walls formed on opposite sides of the bottom face, wherein the side walls form tapered faces to gradually decrease the space between the side walls toward the bottom face, and the tapered faces are in contact with the track rail.

7. A miniature linear motion guide unit according to claim 1, wherein the recessed grooved has a bottom face and side walls formed on opposite sides of the bottom face;

wherein the side walls form tapered faces to gradually decrease the space between the side walls toward the bottom face, and the tapered faces are in contact with the track rail.

8. A miniature linear motion guide unit according to claim 1, wherein the fixing member and the track rail have a relationship in which the fixing member lies along the axis of the track rail when the recessed groove straddles the track rail.

9. A miniature linear motion guide unit according to claim 1, wherein the fixing member and the track rail have a relationship in which the fixing member lies at right angles to the axis of the track rail when the recessed groove straddles the track rail.

* * * * *